United States Patent
Gupta et al.

(10) Patent No.: US 10,884,867 B2
(45) Date of Patent: Jan. 5, 2021

(54) SYSTEMS AND METHODS PROVIDING INCREMENTAL BACKUP FOR PERSISTENT SERVICES

(71) Applicant: SAP SE, Walldorf (DE)

(72) Inventors: Gaurav Gupta, Karnataka (IN); Shashank Mohan Jain, Karnataka (IN)

(73) Assignee: SAP SE, Walldorf (DE)

( * ) Notice: Subject to any disclaimer, the term of this patent is extended or adjusted under 35 U.S.C. 154(b) by 247 days.

(21) Appl. No.: 16/200,940

(22) Filed: Nov. 27, 2018

(65) Prior Publication Data

US 2020/0167236 A1 May 28, 2020

(51) Int. Cl.
*G06F 11/14* (2006.01)
*G06F 3/06* (2006.01)

(52) U.S. Cl.
CPC .......... *G06F 11/1451* (2013.01); *G06F 3/064* (2013.01); *G06F 3/065* (2013.01); *G06F 3/0619* (2013.01); *G06F 3/0674* (2013.01); *G06F 2201/84* (2013.01)

(58) Field of Classification Search
CPC ........ G06F 3/0619; G06F 3/064; G06F 3/065; G06F 3/0674; G06F 11/1451; G06F 11/1461; G06F 11/1464
See application file for complete search history.

(56) References Cited

U.S. PATENT DOCUMENTS 9,021,222 B1 * 4/2015 Sadhu ................ G06F 11/1446
711/162

* cited by examiner

*Primary Examiner* — Aracelis Ruiz
(74) *Attorney, Agent, or Firm* — Buckley, Maschoff & Talwalkar LLC (57) ABSTRACT

Some embodiments may be associated with a cloud computing environment. A device layer may execute a kernel and determine that a write to disk storage is requested by an application executing in the cloud computing environment. A kernel function at the device layer may mark buffers of a page in a page cache that correspond to the requested write as dirty. An event-driven mechanism may send an event to an entry handler in user space, wherein the event has a block number associated with the dirty buffer as a payload. the block numbers received via events may be accumulated in the user space until it is determined that a pre-determined condition associated with the accumulated block numbers is satisfied. At that point, blocks associated with the accumulated block numbers may be saved to a persistent data store as an incremental backup.

20 Claims, 9 Drawing Sheets

SYSTEMS AND METHODS PROVIDING INCREMENTAL BACKUP FOR PERSISTENT SERVICES

BACKGROUND

Figure 1:
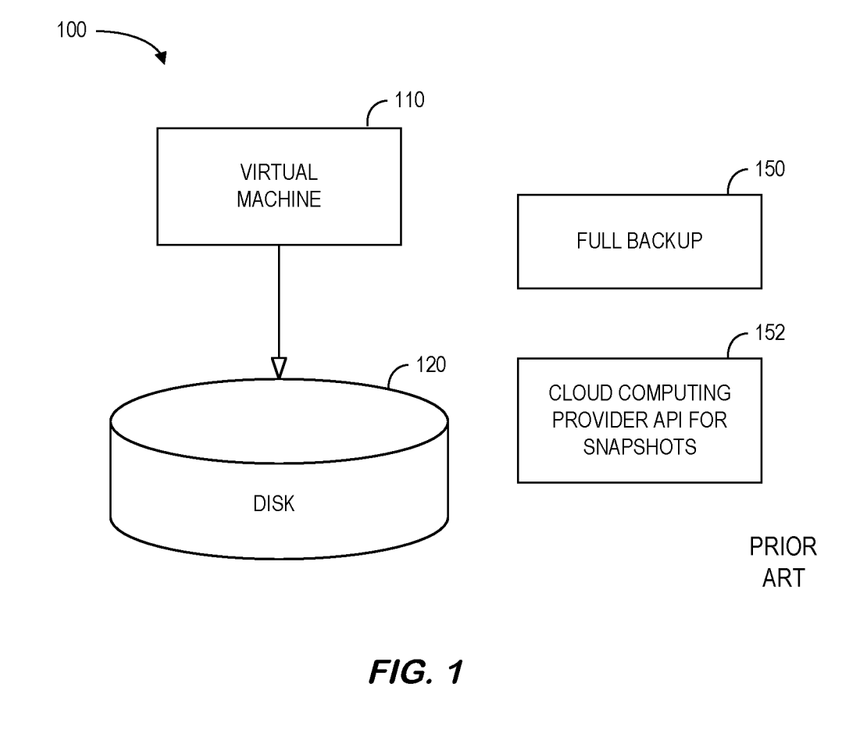
FIG. 1 is a high-level block diagram of a cloud computing system.

In many cases, an enterprise may want to periodically backup data. For example, information on a cloud computing environment disk (e.g., associated with sales data, employees, purchase orders, etc.) might be backed up several times a day so that it could be restored in the event of a failure. FIG. 1 is a high-level block diagram of a cloud computing system 100 where a virtual machine 110 stores information to disk 120 (e.g., associated with a database). In some cases, a full backup 150 of the disk 120 could be taken each time to capture the information. Such an approach, however, is not scalable because as the size of the disk 120 grows (along with the number of full backups that are performed), the amount of data that needs to be saved and the time/performance problems associated with the process can become impractical.

In other cases, the cloud computing provider might implement Application Programming Interface ("API") abilities 152 to create incremental "snapshots" of the disk 120 (e.g., incremental backups of stateful services and applications). Such an approach, however, can be costly if the provider charges for the feature. For example, if an enterprise needs to provide a payment to a cloud computing provider each and every time a "snapshot" is taken, the total expense associated with backups can become impractical. Moreover, some providers might limit how often the feature 152 can be used and/or not offer the feature 152 at all. In addition, moving from one provider to another can be a time-consuming and error prone process as different commands and procedures to support the feature 152 may need to be implemented. That is, because backups are not performed at the virtual machine layer, they may be very dependent on the particular Infrastructure-as-a-Service ("IaaS) provider.

In another approach, an incremental backup process could be implemented via a kernel module, but this technique can raise security concerns. For example, the kernel module has complete access to the system and there is a risk that the process could harm system performance (e.g., if there was a bug in the backup instructions).

It would therefore be desirable to provide for incremental backups in a cloud computing environment in a fast, automatic, and accurate manner.

SUMMARY

Methods and systems may be associated with a cloud computing environment. A device layer may execute a kernel and determine that a write to disk storage is requested by an application executing in the cloud computing environment. A kernel function at the device layer may mark buffers of a page in a page cache that correspond to the requested write as dirty. An event-driven mechanism may send an event to an entry handler in user space, wherein the event has a block number associated with the dirty buffer as a payload. the block numbers received via events may be accumulated in the user space until it is determined that a pre-determined condition associated with the accumulated block numbers is satisfied. At that point, blocks associated with the accumulated block numbers may be saved to a persistent data store as an incremental backup.

Some embodiments comprise: means for determining that a write to disk storage is requested by an application executing in a cloud computing environment; means for marking, by a kernel function at the device layer, buffers of a page in a page cache that correspond to the requested write as dirty; means for sending, by an event-driven mechanism, an event to an entry handler in user space, wherein the event has a block number associated with the dirty buffer as a payload; means for accumulating, in the user space, the block numbers received via events; means for determining that a pre-determined condition associated with the accumulated block numbers is satisfied; and means for saving blocks associated with the accumulated block numbers to a persistent data store as an incremental backup.

Some technical advantages of some embodiments disclosed herein are improved systems and methods to provide for incremental backups in a cloud computing environment in a fast, automatic, and accurate manner.

DETAILED DESCRIPTION

In the following detailed description, numerous specific details are set forth in order to provide a thorough understanding of embodiments. However, it will be understood by those of ordinary skill in the art that the embodiments may be practiced without these specific details. In other instances, well-known methods, procedures, components and circuits have not been described in detail so as not to obscure the embodiments.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 2:
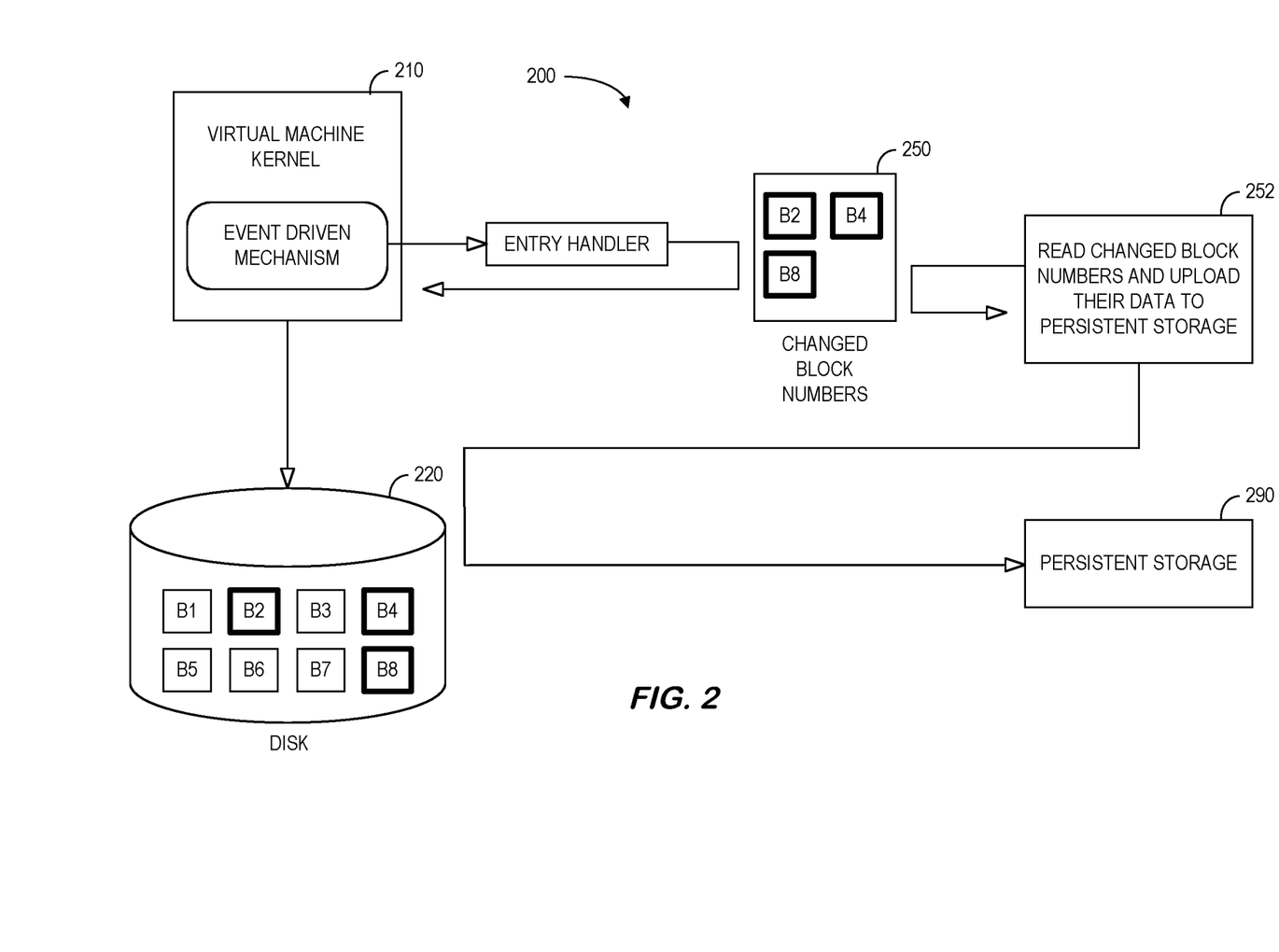
FIG. 2 is a high-level block diagram of a system in accordance with some embodiments.

FIG. 2 is a high-level block diagram of a system 200 in accordance with some embodiments. The system 200 includes a virtual machine 210 that writes information to a disk 220 (e.g., to blocks of information B1 through B8 as illustrated in FIG. 2). An event driven mechanism may indicate to an entry handler (in user space) which blocks have been changed. These changed blocks can be accumulated 250 (as illustrated by the bold blocks B2, B4 and B8 in FIG. 2). When desired, the system 200 can read the changed block numbers 252 and upload their data to persistent storage 290 as an incremental backup. The process might be performed automatically or be initiated via a simple command from a remote operator interface device. As used herein, the term "automatically" may refer to, for example, actions that can be performed with little or no human intervention.

As used herein, devices, including those associated with the system 200 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The virtual machine kernel 210 may store information into and/or retrieve information from various data stores, which may be locally stored or reside remote from the virtual machine kernel 250. Although a single virtual machine kernel 250 is shown in FIG. 2, any number of such devices may be included. Moreover, various devices described herein might be combined according to embodiments of the present invention. For example, in some embodiments, the virtual machine kernel 210 and disk 210 might comprise a single apparatus. The system 200 functions may be performed by a constellation of networked apparatuses, such as in a distributed processing or cloud-based architecture.

A user may access the system 200 via a remote device (e.g., a Personal Computer ("PC"), tablet, or smartphone) to view information about and/or manage operational information in accordance with any of the embodiments described herein. In some cases, an interactive graphical user interface display may let an operator or administrator define and/or adjust certain parameters (e.g., to direct or initiate restoration of a backup) and/or provide or receive automatically generated recommendations or results from the system 200.

Figure 3:
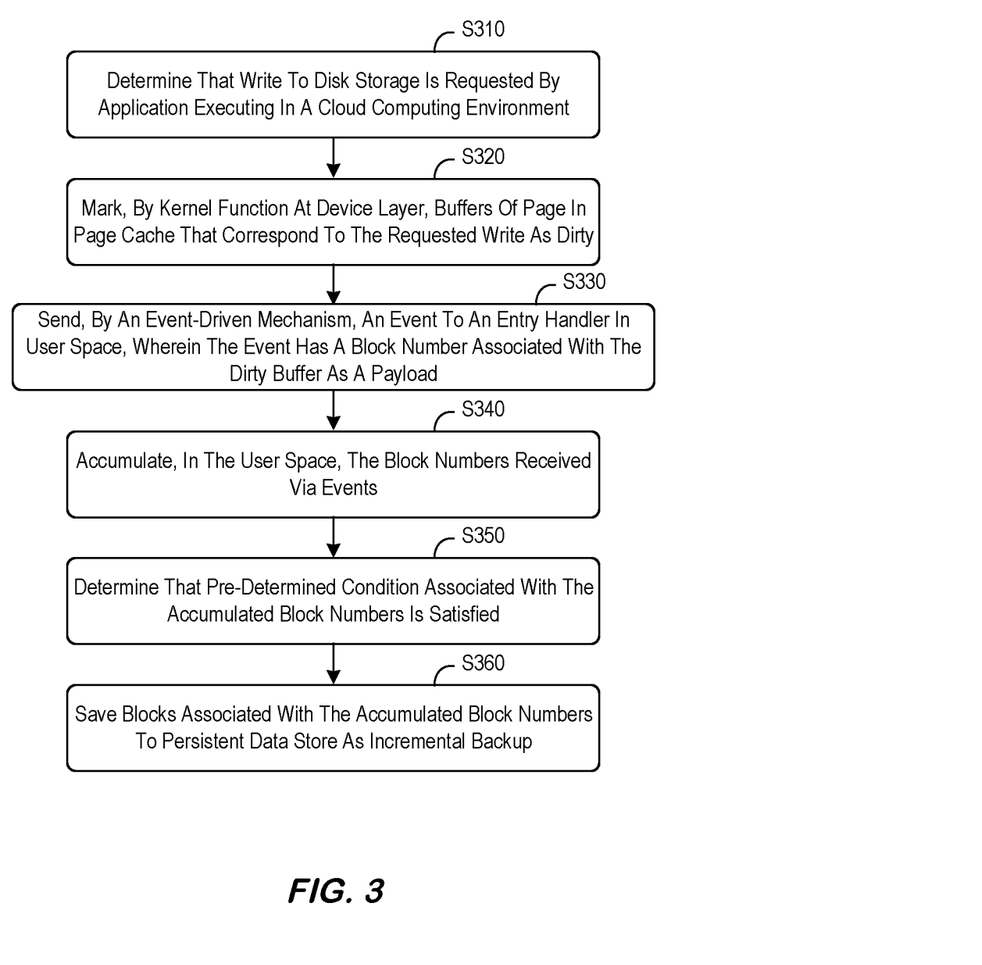
FIG. 3 is a method according to some embodiments.

FIG. 3 is a method that might performed by some or all of the elements of the system 200 described with respect to FIG. 2. The flow charts described herein do not imply a fixed order to the steps, and embodiments of the present invention may be practiced in any order that is practicable. Note that any of the methods described herein may be performed by hardware, software, an automated script of commands, or any combination of these approaches. For example, a computer-readable storage medium may store thereon instructions that when executed by a machine result in performance according to any of the embodiments described herein.

At S310, the system may determine that a write to disk storage is requested by an application executing in a cloud computing environment (e.g., an application might be executing on a virtual machine). According to some embodiments, the cloud computing environment is associated with IaaS data center that provides high-level Application Programming Interfaces ("APIs") to de-reference various low-level details of an underlying network infrastructure like physical computing resources, location, data partitioning, scaling, security, backup, etc. According to some embodiments, the cloud computing environment is associated with a Platform-as-a-Service ("PaaS") data center that provides a platform allowing user to develop, run, and manage applications without the complexity of building and maintaining the infrastructure typically associated with developing and launching applications.

At S320, a kernel function at the device layer may mark buffers of a page in a page cache that correspond to the requested write as dirty. As described with respect to FIG. 4, the kernel function might be implemented as a mark_buffer_dirty function. At S330, an event-driven mechanism may send an event to an entry handler in user space, wherein the event has a block number associated with the dirty buffer as a payload. As described with respect to FIG. 4, the kernel function might be implemented as a kprobe function attached to the kernel function using an enhanced Berkeley Packet Filter ("eBPF").

At S340, the system may accumulate, in the user space, the block numbers received via events. At S350, it may be determined that a pre-determined condition associated with the accumulated block numbers is satisfied. The pre-determined condition might be associated with, for example, some or all of the following parameters: a user trigger (manually selected by the user as described in connection with FIG. 9), an amount of time (e.g., every hour, once-per-day, etc.), a total number of blocks accumulated in the user space (e.g., after 1 Gb of data has been changed), etc. At S360, the system may save blocks associated with the accumulated block numbers to a persistent data store as an incremental backup. The persistent data store might be associated with, for example, the AMAZON® Web Service ("AWS®") Simple Storage Service ("S3"). Note that the saved blocks might be associated with, according to some embodiments, block workloads and/or file workloads.

Figure 4:
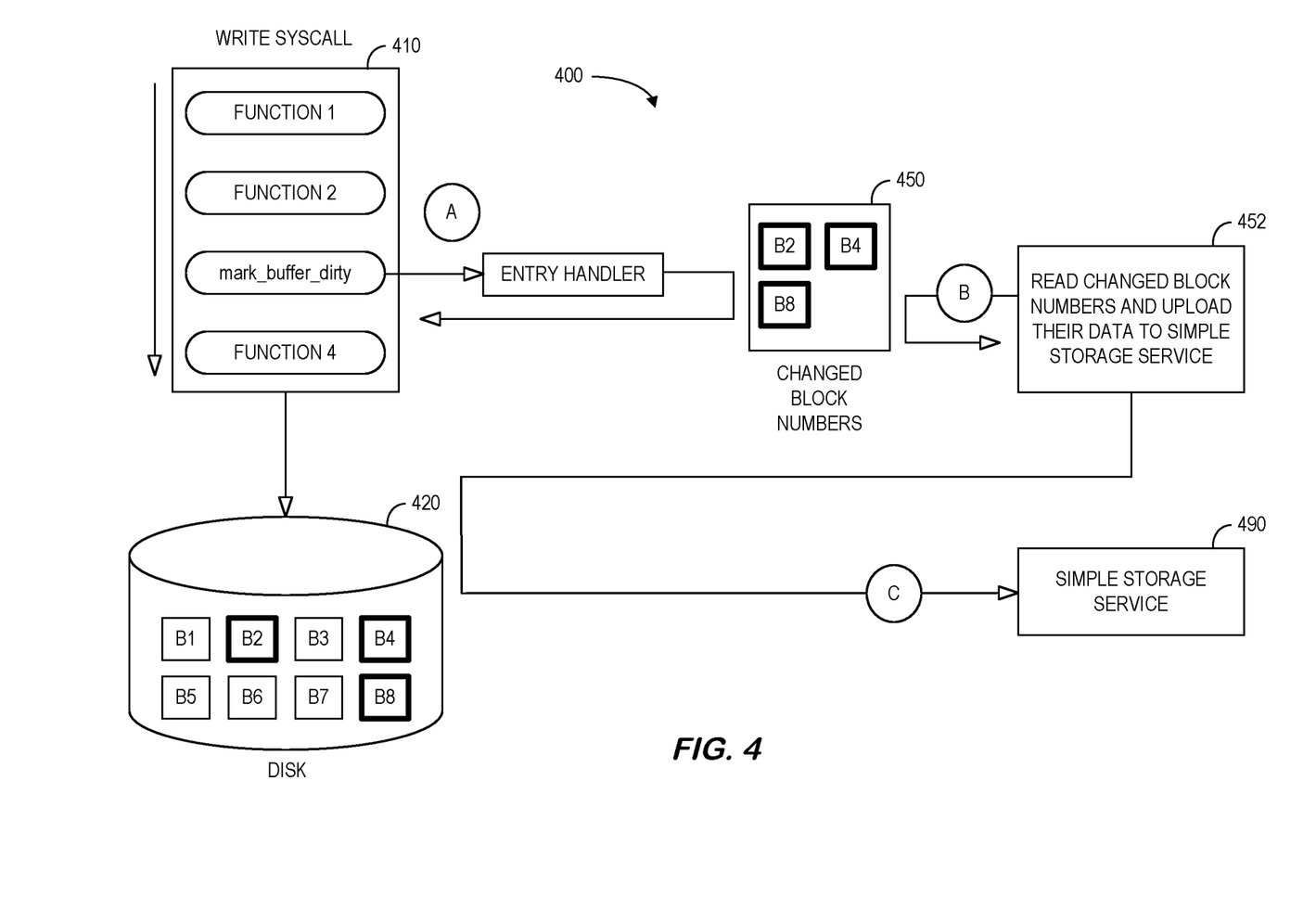
FIG. 4 is a more detailed block diagram of a system in accordance with some embodiments.

FIG. 4 is a more detailed block diagram of a system in accordance with some embodiments. The system 400 includes a write syscall 410 that writes information to a disk 420 (e.g., to blocks of information B1 through B8 as illustrated in FIG. 4). At (A), a mark_buffer_dirty function may indicate to an entry handler (in user space) which blocks have been changed. These changed blocks can be accumulated 450 (as illustrated by the bold blocks B2, B4 and B8 in FIG. 4). When desired, the system 400 can read the changed block numbers 452 at (B) and upload their data to simple storage service 490 at (C) as an incremental backup.

According to some embodiments, a native Linux feature called eBPF may be used to take the incremental backups by recording changes at the block level of the disk 420. The original BPF was designed to capture and filter network packets that matched specific rules. Filters may be implemented as programs to be run on a register-based virtual machine. The introduction of eBPF allows parameters to be passed to functions in eBPF virtual machine registers, just like on native hardware. An eBPF program is "attached" to a designated code path in the kernel. When the code path is traversed, any attached eBPF programs are executed. Thus, eBPF provides an ability to attach user-provided functions to arbitrary kernel functions. These user-provided functions get called when the flow of the kernel is passed to the function it is attached to. Some embodiments described herein use the Linux kernel function "mark_buffer_dirty" as the hook. The format may comprise mark_buffer_dirty (struct buffer_head*bh) to mark a buffer_head as needing writeout. The parameters associated with mark_buffer_dirty may include struct buffer_head*bh (the buffer_head to mark dirty). The atomic function will set the dirty bit against the buffer, set its backing page dirty, tag the page as dirty in its address_space's radix tree, and then attach the address_space's inode to its superblock's dirty inode list.

When a "write" is requested by any application, the corresponding page in the page cache has its buffers (represented by a list of buffer_head structures) marked as "dirty" by the kernel function mark_buffer_dirty. The buffer_head structure may be passed as an argument to the function, which contains the corresponding block number in the blocknr field. Using eBPF, from user space, the system 400 may attach a kernel probe (also referred to as a "kprobe") to the above function. A kprobe may dynamically break into almost any kernel routine and collect debugging and performance information non-disruptively (e.g., associated with a trap at almost any kernel code address and specifying a handler routine to be invoked when the breakpoint is hit). A kprobe can be inserted on virtually any instruction in the kernel, and a return probe fires when a specified function returns. In the typical case, kprobe-based instrumentation is packaged as a kernel module. The module's init function installs ("registers") one or more probes, and the exit function unregisters them. A kprobe is a user provided function which is called from the kernel, in the kernel mode, whenever the function it is attached to is called. This kprobe function reads the block number (from the buffer_head structure passed to mark_dirty_buffer) and sends a perf_event to the user space with the block number as the data payload.

The user space component may accumulate these block numbers for which the buffers are marked dirty in the kernel. When the incremental backup is triggered by a user (or after a fixed amount time interval), these blocks may be directly read from the disk 420 using utilities such as data duplicator ("dd") and saved in a persistent data store (e.g., an S3 bucket). According to some embodiments, to capture the changes during the backup process another eBPF program or a kernel module may be used to track the changing blocks and their data.

Figure 5:
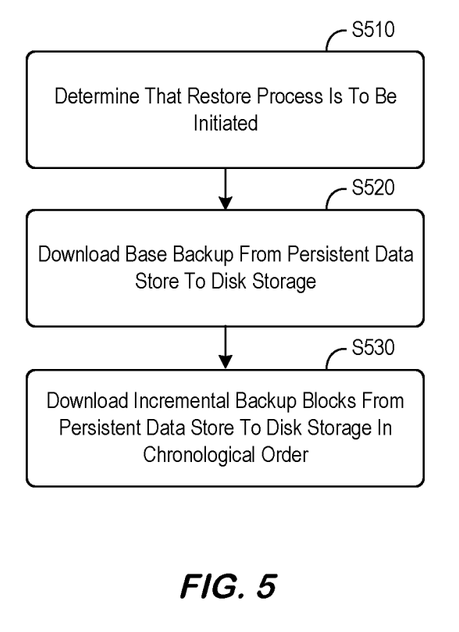
FIG. 5 is a restore process method according to some embodiments.

When the user needs to restore the system 400 to a previous point in time, he or she can apply the block-level base backup, pull the above incremental backups from persistent storage, and apply them to the disk in chronological order. FIG. 5 is a restore process method according to some embodiments. At S510, the system may determine that a restore process is to be initiated (e.g., as described in connection with FIG. 9). At S520, the system may download a base backup from persistent data store to disk storage. At S530, the system may download incremental backup blocks from the persistent data store to the disk storage in chronological order.

Figure 6:
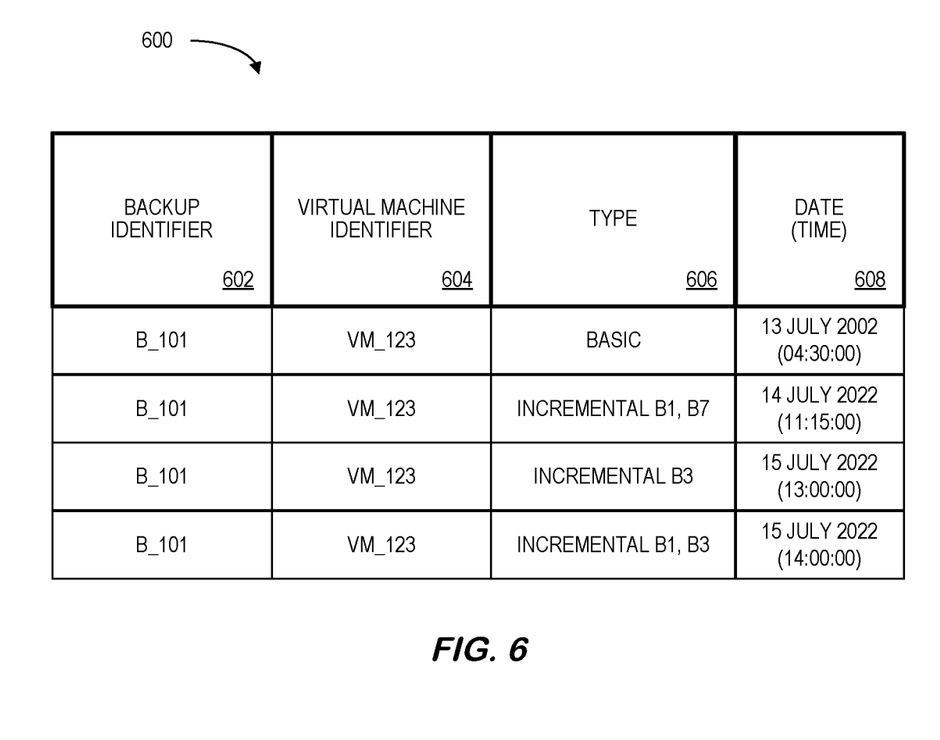
FIG. 6 is portion of a tabular backup data store in accordance with some embodiments.

Referring to FIG. 6, a table is shown that represents the backup data store 600 that may be provided according to some embodiments. The table may include, for example, entries identifying backup information that has been captured by the system. The table may also define fields 602, 604, 606, 608 for each of the entries. The fields 602, 604, 606, 608 may, according to some embodiments, specify: a backup identifier 602, a virtual machine identifier 604, a type 606, and a date and time 608. The backup data store 600 may be created and updated, for example, when new virtual machines are initiated, when writes are performed to a disk, etc.

The backup identifier 602 might be a unique alphanumeric label or link that is associated with particular backup information that has been captured in connection with disk or device represented by the virtual machine identifier 604 (e.g., a virtual machine executing in a cloud computing environment). The type 606 might indicate if the information is "basic" (e.g., a full backup taken once-per-week) or an incremental backup (e.g., a backup taken every hour that includes identifiers that indicate which block numbers are associated with the increment). The date and time 608 might indicate when the backup information was captured (and may be used, for example, to re-apply the information in chronological order when appropriate).

Figure 7:
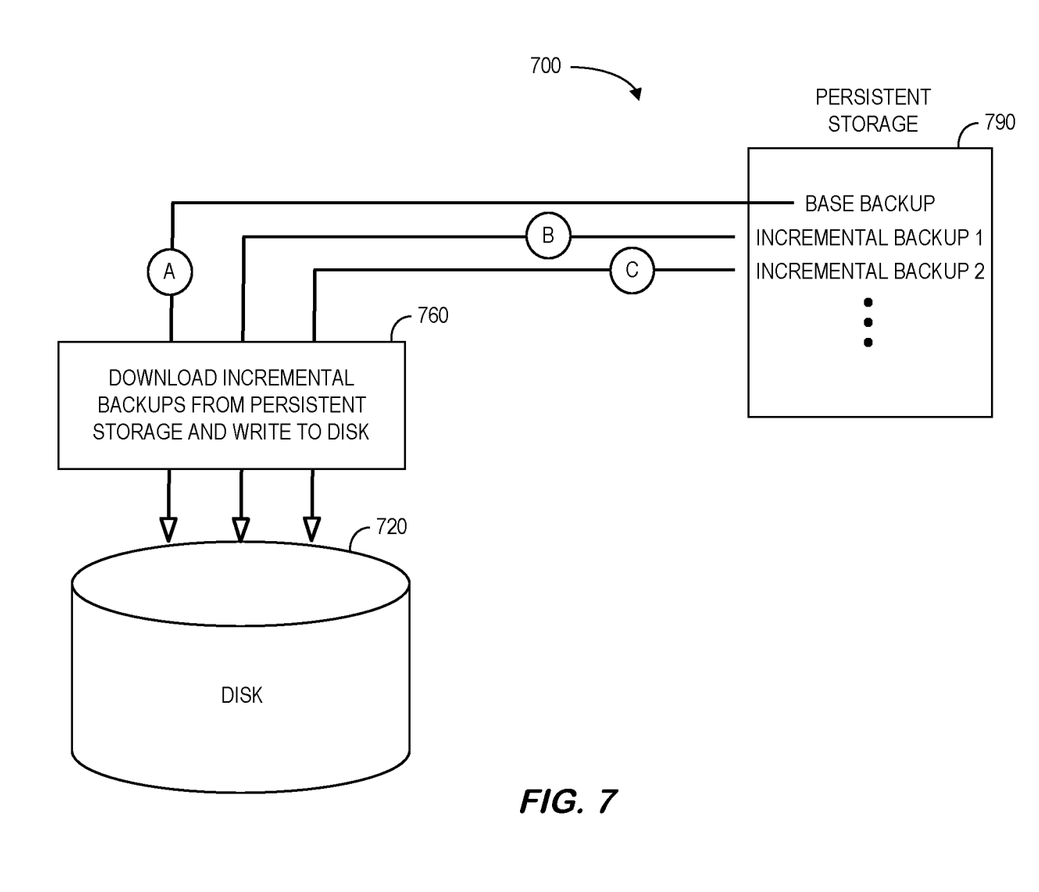
FIG. 7 is a data flow associated with a restore process in according with some embodiments.

FIG. 7 is a data flow 700 associated with a restore process in according with some embodiments. When it is determined 760 that a system is to be restored, a base backup is downloaded at (A) from persistent storage 790 and written to a disk 720. The system then downloads the oldest incremental backup from persistent storage 790 at (B) and writes it to the disk 720. The next-oldest incremental backup is then downloaded at (C) from persistent storage 790 and written to the disk 720. This process continues, in chronological order, until the restore process in complete.

Figure 8:
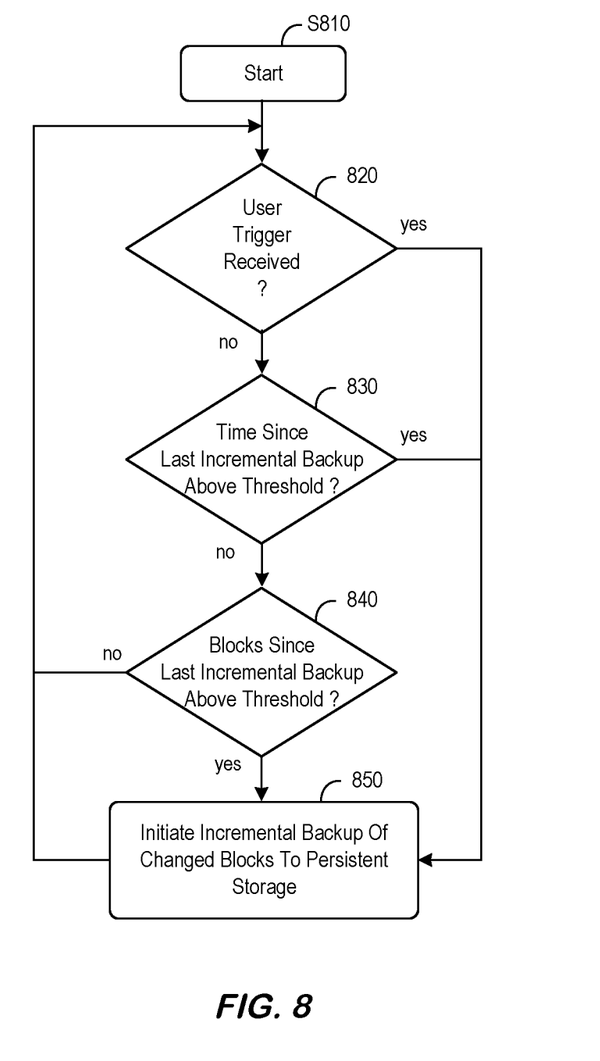
FIG. 8 is a method of determining when a restore process should be initiated according to some embodiments.

FIG. 8 is a method of determining when a backup process should be initiated according to some embodiments. After beginning at S810, the system checks to see if a user trigger has been received at S820 (e.g., did the user select a "backup" option on a graphical user interface as described in connection with FIG. 9?). If a user trigger was received at S810, the system initiates the incremental backup of changed blocks to persistent storage at 850 and the process continues (to determine when the next backup should be captured).

If a user trigger was not received at S810, the system checks whether the time since the last backup exceeds a threshold value at S820 (e.g., was the last backup captured more than one hour ago?). If the time exceeds the threshold value at S830, the system initiates the incremental backup of changed blocks to persistent storage at 850 and the process continues (to determine when the next backup should be captured).

If the time did not exceed the threshold value at S830, the system checks whether the number of blocks changed since the last incremental backup was captured exceeds a threshold value at S840. If the number of blocks exceeds the threshold value at S840, the system initiates the incremental backup of changed blocks to persistent storage at 850 and the process continues (to determine when the next backup should be captured). If the number of blocks did not exceed the threshold value at S840, the process continues at S820. Note that the embodiment of FIG. 8 is constructed such that a backup is captured if any of the three conditions 820, 830, 840 are captured. Embodiments may be implemented, however, in any number of ways (including, for example, fewer conditions, more conditions, requirement multiple conditions to be true, etc.).

Figure 9:
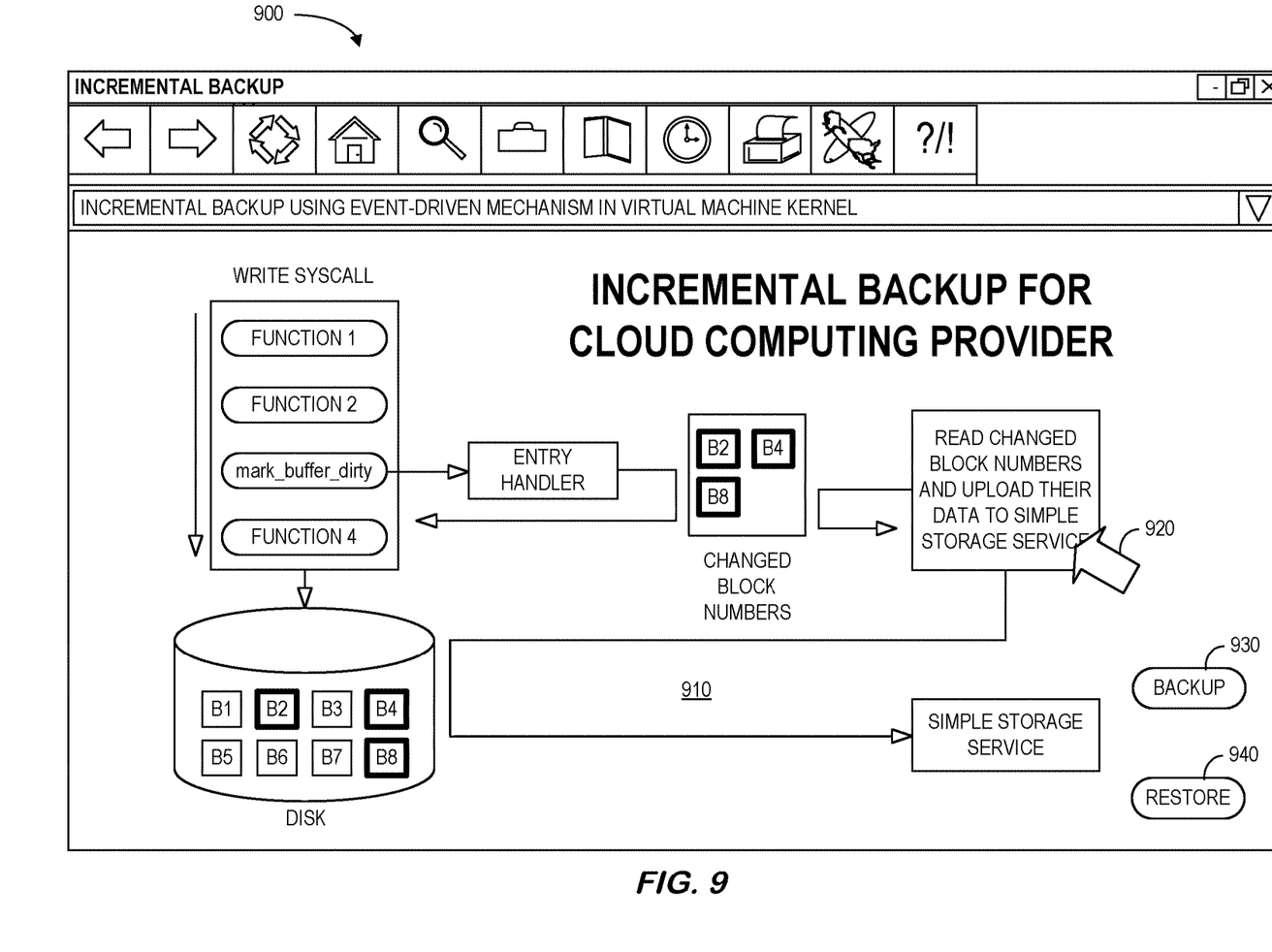
FIG. 9 is a human machine interface display according to some embodiments.

FIG. 9 is a human machine interface display 900 in accordance with some embodiments. The display 900 includes a graphical representation 910 of elements of an incremental backup system for a cloud computing environment (e.g., PaaS, IaaS, etc.). Selection of an element (e.g., via a touch-screen or computer pointer 920) may result in display of a pop-up window containing various options (e.g., to view a backup status, an in-progress restore operation, etc.). The display 900 may also include a user-selectable "backup" icon 930 (e.g., to capture an incremental backup by moving changed blocks to persistent storage) and "restore" icon 940 (e.g., to initiate an automated restoration process as described with respect to FIGS. 5 through 7).

Thus, embodiments may provide for incremental backups in a cloud computing environment in a fast, automatic, and accurate manner. Moreover, overhead associated with the process may be very minimal because everything happens in kernel space. Also, since the system doesn't copy the data itself (only the block identifiers or numbers), space is saved at least while accumulating the changed blocks. During the time of backup capture, all of the data may be taken and stored in a relatively inexpensive storage element such as S3. In addition, no payments to a cloud service provider are required on a snapshot-by-snapshot basis (thus saving money). Moreover, the solution is completely independent of the applications that are being executed as well as the particular cloud provider (because they are performed at the virtual machine layer). As a result, various cloud computing providers can be utilized without making changes for AWS®, Azure® from MICROSOFT®, etc. to support incremental backups. In addition, embodiments may not involve any kernel module related security implications (so it is relatively safe to use). For example, complete security may be provided as compared to installing a kernel module to achieve the same result (which can result in any bug in the kernel module crashing the entire Operating System ("OS")). The eBPF-based incremental backup solution may work for both block workloads and file workloads. Because the system captures the block layout of the device, some embodiments may also be used to migrate from one cloud provider to another (e.g., from AWS® to Azure®).

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although specific hardware and data configurations have been described herein, note that any number of other configurations may be provided in accordance with some embodiments of the present invention (e.g., some of the information associated with the databases described herein may be combined or stored in external systems). Moreover, although some embodiments are focused on particular types of disks, databases, and cloud computing environments, any of the embodiments described herein could be applied to other types of storage devices or data center providers.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

The invention claimed is:

1. A system associated with a cloud computing environment, comprising:
a device layer executing a kernel to:
(i) determine that a write to disk storage is requested by an application executing in the cloud computing environment,
(ii) mark, by a kernel function at the device layer, buffers of a page in a page cache that correspond to the requested write as dirty, and
(iii) send, by an event-driven mechanism, an event to an entry handler in user space, wherein the event has a block number associated with the dirty buffer as a payload; and
a user space computer component to:
(iv) accumulate, in the user space, the block numbers received via events;
(v) determine that a pre-determined condition associated with the accumulated block numbers is satisfied, and
(vi) save blocks associated with the accumulated block numbers to a persistent data store as an incremental backup.

2. The system of claim 1, wherein the cloud computing environment is associated with at least one of: (i) an Infrastructure-as-a-Service ("IaaS") data center, and (ii) a Platform-as-a-Service ("PaaS") data center.

3. The system of claim 1, wherein the event-driven mechanism is a kprobe function attached to the kernel function using an enhanced Berkeley Packet Filter.

4. The system of claim 1, wherein the kernel function comprises a mark_buffer_dirty function and the event comprises a perf_event.

5. The system of claim 1, wherein the pre-determined condition is associated with at least one of: (i) a user trigger, (ii) an amount of time, and (iii) a total number of blocks accumulated in the user space.

6. The system of claim 5, wherein the persistent data store comprises simple storage service.

7. The system of claim 5, further comprising:
determining that a restore process is to be initiated;
downloading a base backup from the persistent data store to the disk storage; and
downloading incremental backup blocks from the persistent data store to the disk storage in chronological order.

8. The system of claim 1, wherein the saved blocks are associated with at least one of: (i) block workloads, and (ii) file workloads.

9. A computer-implemented method associated with a cloud computing environment, comprising:
determining that a write to disk storage is requested by an application executing in the cloud computing environment;
marking, by a kernel function at a device layer, buffers of a page in a page cache that correspond to the requested write as dirty;
sending, by an event-driven mechanism, an event to an entry handler in user space, wherein the event has a block number associated with the dirty buffer as a payload;
accumulating, in the user space, the block numbers received via events;
determining that a pre-determined condition associated with the accumulated block numbers is satisfied; and
saving blocks associated with the accumulated block numbers to a persistent data store as an incremental backup.

10. The method of claim 9, wherein the event-driven mechanism is a kprobe function attached to the kernel function using an enhanced Berkeley Packet Filter.

11. The method of claim 9, wherein the kernel function comprises a mark_buffer_dirty function and the event comprises a perf_event.

12. The method of claim 9, wherein the pre-determined condition is associated with at least one of: (i) a user trigger, (ii) an amount of time, and (iii) a total number of blocks accumulated in the user space.

13. The method of claim 12, wherein the persistent data store comprises simple storage service.

14. The method of claim 12, further comprising:
determining that a restore process is to be initiated;
downloading a base backup from the persistent data store to the disk storage; and downloading incremental backup blocks from the persistent data store to the disk storage in chronological order.

15. The method of claim 9, wherein the saved blocks are associated with at least one of: (i) block workloads, and (ii) file workloads.

16. A non-transitory, computer readable medium having executable instructions stored therein, the medium comprising:
    instruction to determine that a write to disk storage is requested by an application executing in a cloud computing environment;
    instructions to mark, by a kernel function at a device layer, buffers of a page in a page cache that correspond to the requested write as dirty;
    instructions to send, by an event-driven mechanism, an event to an entry handler in user space, wherein the event has a block number associated with the dirty buffer as a payload;
    instructions to accumulate, in the user space, the block numbers received via events;
    instructions to determine that a pre-determined condition associated with the accumulated block numbers is satisfied; and
    instructions to save blocks associated with the accumulated block numbers to a persistent data store as an incremental backup.

17. The medium of claim 16, wherein the event-driven mechanism is a kprobe function attached to the kernel function using an enhanced Berkeley Packet Filter.

18. The medium of claim 16, wherein the kernel function comprises a mark_buffer_dirty function and the event comprises a perf_event.

19. The medium of claim 16, wherein the pre-determined condition is associated with at least one of: (i) a user trigger, (ii) an amount of time, and (iii) a total number of blocks accumulated in the user space.

20. The medium of claim 19, further comprising:
    instruction to determine that a restore process is to be initiated;
    instruction to download a base backup from the persistent data store to the disk storage; and
    instruction to download incremental backup blocks from the persistent data store to the disk storage in chronological order.

* * * * *